US 6,625,309 B1

(12) United States Patent
Li et al.

(10) Patent No.: US 6,625,309 B1
(45) Date of Patent: Sep. 23, 2003

(54) IMAGE PARTITIONING TO AVOID OVERLAP TRANSMISSION

(75) Inventors: Chia-Hsin Li, San Jose, CA (US); Viresh Ratnakar, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/408,108

(22) Filed: Sep. 29, 1999

(51) Int. Cl.⁷ .................... G06K 9/34; G06F 17/00
(52) U.S. Cl. ............... 382/173; 345/418; 382/240
(58) Field of Search ............... 382/173, 166, 382/232, 244, 245, 284, 276, 240, 248, 249, 305; 345/635, 501, 421, 619, 788, 792, 422, 418

(56) References Cited

U.S. PATENT DOCUMENTS

| | | | |
|---|---|---|---|
| 5,134,572 A | 7/1992 | Takasaki et al. ............ 345/501 |
| 5,212,742 A | 5/1993 | Normile et al. ............. 382/166 |
| 5,436,981 A | 7/1995 | Ishikawa .................... 382/173 |
| 5,640,607 A | 6/1997 | Murray ........................ 710/68 |
| 5,812,704 A | 9/1998 | Pearson et al. ............. 382/284 |
| 5,841,420 A | * 11/1998 | Kaply et al. ................. 345/421 |
| 5,917,962 A | 6/1999 | Chen et al. ................. 382/291 |
| 6,141,007 A | * 10/2000 | Lebling et al. ............. 345/792 |
| 6,215,490 B1 | * 4/2001 | Kaply ......................... 345/788 |
| 6,307,559 B1 | * 10/2001 | Hancock et al. ............ 345/619 |
| 6,317,757 B1 | 11/2001 | Sakamaki .................... 707/502 |

FOREIGN PATENT DOCUMENTS

JP          10-283298          10/1998

* cited by examiner

*Primary Examiner*—Bhavesh M. Mehta
*Assistant Examiner*—Kanji Patel

(57) ABSTRACT

Image partitioning methods, which may be implemented by software or hardware on a computer, partition a set of multiple overlapping images to be transmitted so that only the visible portions of the images are transmitted. The underlying partitioning algorithm uses rectangles to iteratively partition the image set.

9 Claims, 8 Drawing Sheets

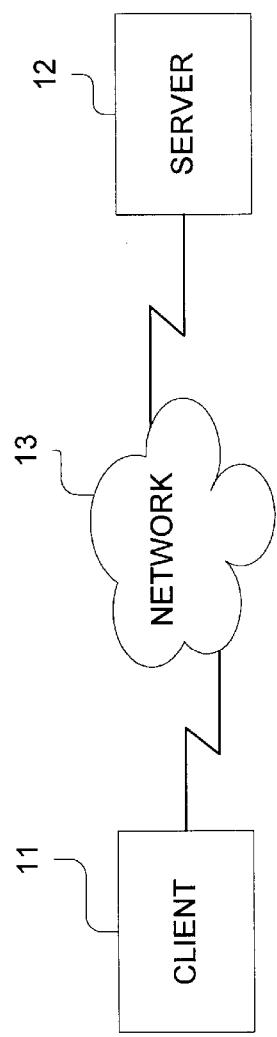
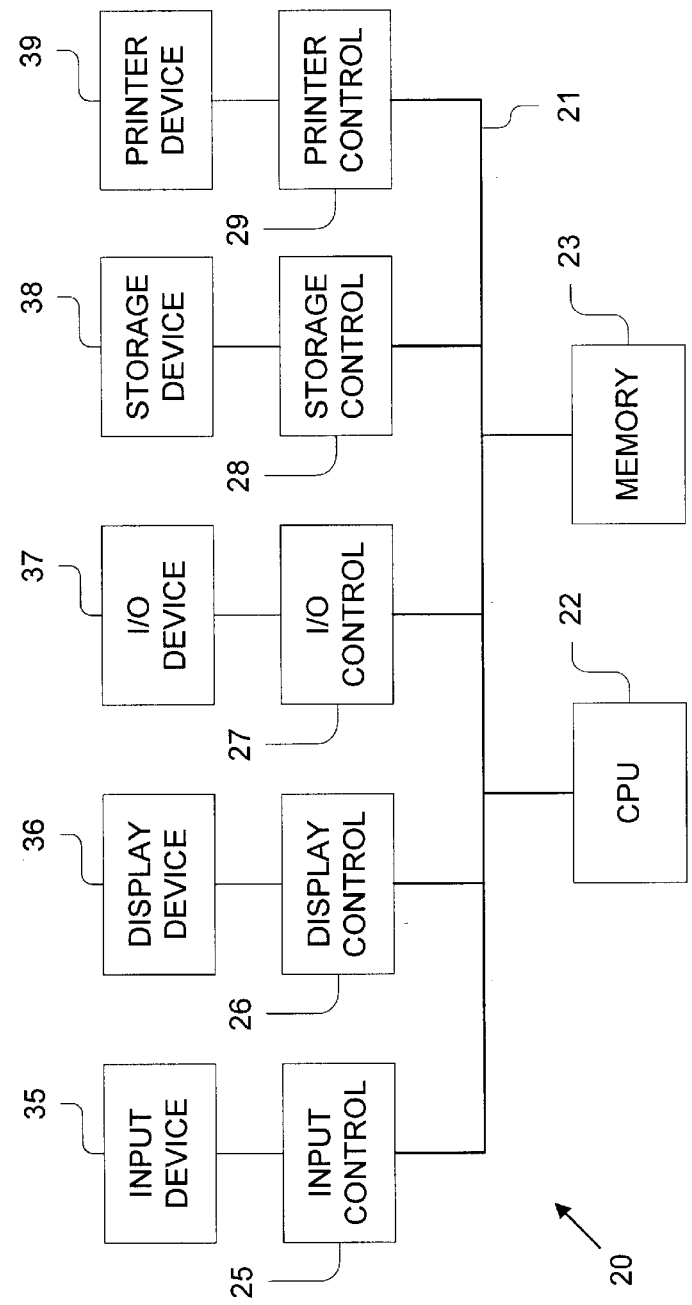

IMAGE PARTITIONING TO AVOID OVERLAP TRANSMISSION

BACKGROUND OF THE INVENTION

1. Field of the Invention

This invention relates to image partitioning methods and devices, such as computers, on which such methods may be implemented. More particularly, the invention relates to the partitioning of a set of overlapping images to improve downloading and processing efficiency. Overlapping images are partitioned so that when the image data is transmitted (i.e., downloaded) only the visible portions of the images are downloaded. Invisible image portions are not transmitted to conserve bandwidth.

2. Description of the Related Art

Various online utilities exist that let a user create and edit graphics such as business cards and greeting cards over the internet with a standard web browser. Many of these utilities allow the user to add one or more images to the greeting or business card. The user may move the images around, resize them, rotate them, etc.

During the manipulation process, the user is typically dealing only with thumbnail sized images. This minimizes the demands on the client machine. It also minimizes the download time. Downloading of the full size image can be delayed until the user is ready to print. This way, if the user changes his mind about which image he wants to use, no time is wasted downloading a full size image.

In some cases, the user may wish to incorporate in the graphics document multiple images, some of which partially overlap. In any region of overlap only the corresponding portion of the topmost image is visible; the corresponding portions of the images further down in the stack are occluded. Under the current state of the art, when the user wants to download the images, all of the image data is downloaded, even data of image portions that will not be visible. This is time consuming and unnecessary.

SUMMARY OF THE INVENTION

It is an object of the present invention to overcome the aforementioned problems and disadvantages of conventional processing of overlapping images.

Another object of this invention is to provide a system for partitioning a set of overlapping images to improve transmitting and processing efficiency.

A further object of this invention is to provide a system for partitioning a set of overlapping images such that only the visible portions of the images are transmitted.

Still another object of this invention is to provide a system for partitioning a set of overlapping images that are in compressed domain and transmitting only the compressed data from the partitioned area.

According to one aspect of this invention, a method is provided for partitioning a group of images including at least a first, bottom-most image and a second image in front of, and partially overlapping, the first image. The method comprises partitioning a non-overlapped portion of the first image into at least two sections based on the position of the second image to form a first set of image elements; and transmitting only the first set of image elements.

If necessary, a non-overlapped portion of each partially overlapped image element in the first set of image elements is preferably further partitioned in a second partitioning stage into at least two sections based on the position a third image in the group of images that partially overlaps the first set of image elements. This second stage of partitioning results in the formation of a second set of image elements. In this case, only the first and second sets of image elements are transmitted.

In another aspect of the invention a method is provided for partitioning a group of images, at least some of which partially overlap, the group of images including a first, bottom-most image and a last, top-most image. The method comprises partitioning a non-overlapped portion of the first image into a plurality of rectangles based on the position of a second image in front of, and partially overlapping, the first image to form a first set of rectangles; iteratively forming new sets of rectangles by partitioning a current set of rectangles based on a next image in the group of images until a final set of rectangles is formed based on the position of the top-most image; and transmitting only the final set of rectangles. Preferably, the first set of rectangles includes the second image and each additional set of rectangles includes the image on which the partitioning for that additional set is based.

Preferably, the first set of image elements includes the second image, and the second set of image elements includes the third image.

Also, preferably, each section and image element is in the shape of a rectangle.

Also, preferably, the partitioning is done in compressed or partially compressed domain.

According to another aspect of the invention, an apparatus is provided for partitioning a group of images in accordance with the above-described method(s). The apparatus, which may be a digital computer, other processor-controlled device, or equivalent.

In yet another aspect of the invention, the above-described method(s) may be embodied in a program of instructions which is stored on a medium readable by a digital computer or other processor-controlled device. Alternatively, the method(s) may be implemented using hardware or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 is a schematic representation of a network interconnecting a network client and a network server;

FIG. 2 is a functional block diagram of a typical computer that may be used as a network client or network server to implement various aspects of the present invention;

DESCRIPTION OF THE PREFERRED EMBODIMENTS

Figure 3A:
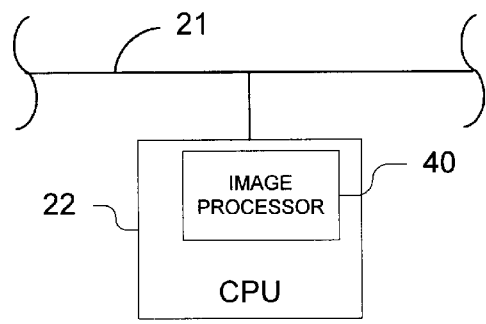
FIGS. 3A, 3B and 3C show various implementations of all or part of the image partitioning techniques of the present invention.

The image partitioning techniques of the present invention may be used with graphics or image processing applications where a user is working with multiple images, some or all of which partially overlap, and the image data is to be transmitted. Such applications may include, for example, programs that allow a user to create business or greeting cards. The techniques of the present invention improve transmitting and processing efficiency by partitioning the multiple overlapping images so that only the visible portions of the images are transmitted. Thus, the present invention has particular utility in connection with online graphics or image processing applications where the user is working on a client computer that is interacting with a server through a network.

FIG. 1 is a schematic representation of a network. For ease of illustration, only one client and one server are shown; however, it will be apparent to those skilled in the art that the network may (and typically does) include a plurality of clients and servers. Network client 11 uses network 13 to access resources provided by network server 12. Although it is contemplated that network server 12 is a hypermedia server, perhaps operating in conformity with the Hypertext Transfer Protocol (HTTP), this is not necessary to practice the present invention. The nature of the communication paths connecting network client 11 and network server 12 are not critical to the practice of the present invention. Such paths may be implemented as switched and/or non-switched paths using private and/or public facilities. Similarly, the topology of network 13 is not critical and may be implemented in a variety of ways including hierarchical and peer-to-peer networks. Network client 11 and network server 12, for example, may be locally located with respect to one another and may be implemented on the same hardware.

FIG. 2 is a functional block diagram of a typical computer system 20 that may be used to implement network client 11 and/or network server 12. As shown, this computer system includes bus 21 that interconnects central processing unit (CPU) 22, system memory 23 and several device interfaces. Bus 21 can be implemented by more than one physical bus such as a system bus and a processor local bus. CPU 22 represents processing circuitry such as a microprocessor. System memory 23 represents various memory components such as random access memory (RAM) and read only memory (ROM). Input control 25 represents interface circuitry that connects to one or more input devices 35 such as a keyboard, mouse, track ball or stylus. Display control 26 represents interface circuitry that connects to one or more display devices 36 such as a video display terminal. I/O control 27 represents interface circuitry that connects to one or more I/O devices 37 such as a modem or a network connection. Storage control 28 represents interface circuitry that connects to one or more storage devices 38 such as a magnetic disk drive, magnetic tape drive, optical disk drive or solid-state storage device. Printer control 29 represents interface circuitry that connects to one or more printer devices 39 such as a laser printer, ink-jet printer or plotter. No particular type of computer system is critical to practice the present invention. For example, a computer with a bus architecture different from that illustrated in FIG. 2 may be used.

In a preferred embodiment, computer system 20 carries out the image partitioning techniques of the present invention by using CPU 22 to execute a program of instructions residing in RAM that may be fetched from ROM, storage device 38 or obtained from a network server or other source through I/O device 37. The program of instructions (i.e., software) may be conveyed by a medium that is readable by a computer or other processor-controlled device, including various magnetic media such as disk or tape, various optical media such as compact discs, and optical, infrared, and baseband or modulated communication paths throughout the electromagnetic spectrum from supersonic to ultraviolet frequencies. Thus, the term "device readable medium" as used in the claims is intended to cover all such media including a carrier wave encoded to transmit the program of instructions.

Figure 3B:
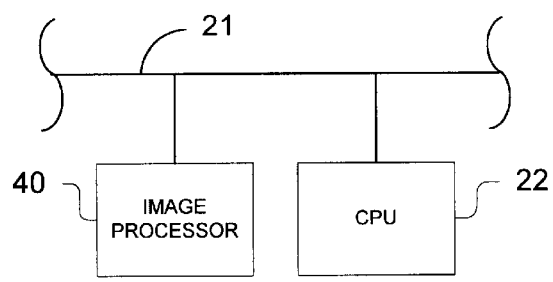
Figure 3C:
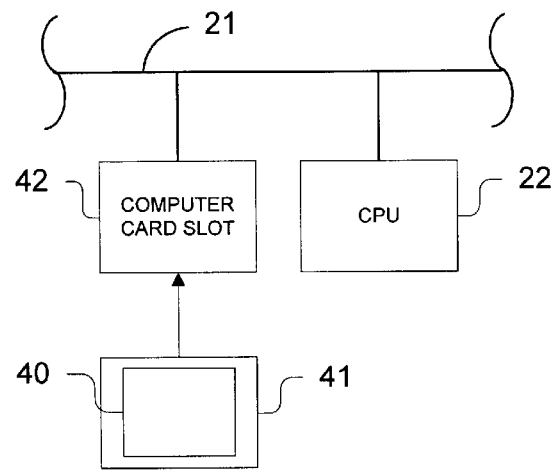

Alternatively, the image partitioning techniques of the present invention may be implemented with hardware using discrete components, application specific integrated circuits (ASICs), digital signal processors, or the like. Such hardware may be embodied, for example, in an image processor 40 which may be physically integrated with the CPU 22 (FIG. 3A) or may be a separate element. Where the image processor 40 is a separate element, it may be embodied in the computer 20 itself (FIG. 3B) or on an option card 41 that can be inserted into an available computer card slot 42 (FIG. 3C).

The image partitioning techniques may also be implemented using a combination of software and hardware. Various aspects of the underlying partitioning algorithm may be implemented with hardware while others are implemented using software.

Thus, each "means for" clause in the claims is intended to cover the appropriate program fragment(s) or functionally equivalent hardware device(s) for implementing the function described.

Turning now to the underlying image partitioning algorithm of the present invention, a set of overlapping images are partitioned into smaller pieces so only the visible portions of the images are transmitted (i.e., downloaded). The partitioning is preferably done using rectangles since digital devices such as computers typically work with images in the form of rectangles. To further reduce bandwidth consumption and to further improve processing efficiency, the partitioning is preferably done while the images are in the partially compressed (i.e., frequency) domain and thereafter the compressed (i.e., bitstream) data in only the partitioned areas is transmitted.

It should be noted, however, that the invention is not limited to any particular partitioning procedure. Rather, any known spatial domain or frequency domain cropping procedure may be used to do the actual partitioning of the image data. However, in the preferred embodiments, the partitioning is done using a frequency domain cropping procedure, after which the compressed data in only the partitioned areas is transmitted. With JPEG images, the image data is preferably processed in the frequency or partially compressed domain using a JPEG cropping procedure.

Figure 4:
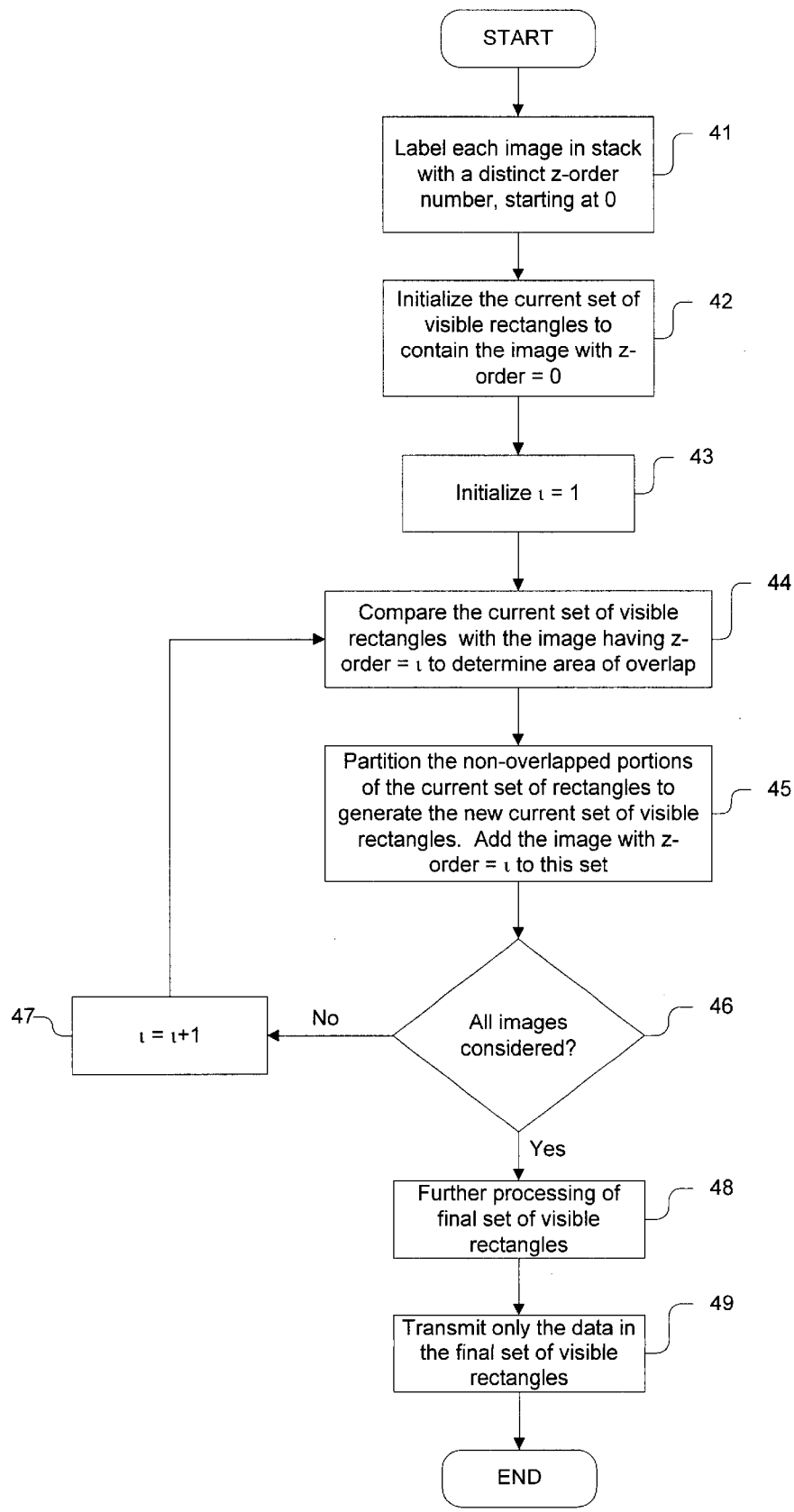
FIG. 4 is a flow diagram illustrating the process of the image partitioning algorithm of the present invention.

FIG. 4 shows a flow diagram which illustrates the process of the iterative imaging partitioning algorithm of the present invention. The algorithm begins at step 41, where, in a stack of overlapping, rectangular images, each image is labeled with a distinct z-order number representing its order in the stack. For example, the z-order numbers may be consecutively assigned so that the lowest number (i.e., 0) represents the bottom-most image in the stack and the highest number (i.e., n−1) represents the top-most image in the stack, where the number of images in the stack is equal to n. With this numbering scheme, a higher z-order number usually indicates a more frontal image. However, there may be a situation where two images each overlap an image immediately below but do not overlap each other. In that case, neither of the two images will be more frontal with respect to the other, although one will have a higher z-order number than the other.

At every stage, the algorithm maintains a current set of visible rectangles, which is initialized to contain the bottom-most image (z-order=0), in step 42. This current set of visible rectangles is iteratively partitioned by the image with the next z-order, at the heart of the algorithm. This next z-order is denoted by the incremented variable i, which is initialized to 1 in step 43.

Next, the current set of visible rectangles is compared with the image having a z-order number of i to determine the area of overlap. After determining the areas of overlap, the non-overlapped portions of all the rectangles in the currently visible set are partitioned to form the next set of rectangles. The image with z-order number of i is also added to this set, and this set becomes the current set of visible rectangles for the next iteration, for which i is incremented to i+1. This process continues, comparing the next image in the z-order with the previously generated (i.e., "current") set of visible rectangles to generate a "new" set of visible rectangles, until all images have been considered. After the last (i.e., top-most) image is considered and the final partitioning completed, a final set of rectangles is generated which represents only the visible portions of the stack of images.

Thus, step 44 may be generally described as comparing the current set of visible rectangles with a rectangle having a z-order of i (i.e., the next-most-frontal image in the stack) to determine the area of overlap. In the first comparison, the current set of visible rectangles consists of only the bottom-most image. Step 45, described more generally, involves partitioning the non-overlapped portion of each partially overlapped rectangle in the current set of visible rectangles to form the next set of visible rectangles which also includes the image with z-order of i.

After each stage of partitioning, the algorithm determines whether or not all of the images in the stack have been considered in the partitioning process (step 46). If not, i is incremented by one in step 47, and the algorithm returns to step 44 to compare the next-most-frontal image in the stack with the "current" set of visible rectangles. The process continues until all images/rectangles have been considered and the partitioning is completed, at which time further processing of the final set of visible rectangles may be done in step 48. Such further processing may include, for example, merging neighboring rectangles that belong to the same image into larger rectangles if it is efficient to do so.

Afterward, in step 49, only the data in the final set of rectangles, which represents only the visible portions of the stack of images, is transmitted to conserve bandwidth and improve processing efficiency. As previously noted, the partitioning is preferably done while the images are in the partially compressed (i.e., frequency) domain. Thus, in the preferred embodiments, after the final set of rectangles is generated, the algorithm extracts the compressed data from the cropped (i.e., partitioned) area represented by the final set of rectangles. The algorithm then sends that data in compressed form. Performing the partitioning in partially compressed domain and transmitting in compressed domain results in an additional reduction in bandwidth and further improvement in processing efficiency.

In a given set of overlapping images, each level of partitioning considers only the "current" set of visible rectangles with respect to the rectangle/image having the next highest z-order in the stack. Each partially overlapped rectangle in the "current" set of visible rectangles is partitioned into smaller rectangles based on the rectangle/image having z-order i to generate a "new" set of visible rectangles including the rectangle defined by the z-order i. This "new" set of rectangles, which now becomes the "current" set of rectangles, is then compared against the next rectangle/image in the stack. Further partitioning of the non-overlapped portions of each partially overlapped rectangle in the "current" set yields a "new" set of rectangles.

A "previous" rectangle in the "current" set gets split up only if a "new" rectangle is in front of it and if the "new" rectangle partially overlaps the "previous" rectangle. The "previous" rectangle may have been the result of an earlier partitioning. The algorithm preferably does not reverse its decision about splitting up a "previous" rectangle. When a "previous" rectangle is to be split, it is advantageous from a computing perspective to split up the "previous" rectangle such that the resulting smaller rectangles are of roughly equal area.

As previously noted, the rectangle is the preferred partitioning shape since computers typically deal with images in rectangles. Thus, in a preferred embodiment, rectangles are not partitioned into irregular polygonal pieces where the edges of the pieces are random line segments. Rather, the edges of the split pieces are either horizontal or vertical. Given rectangles A and B, where A is in front of B, the pieces into which rectangle B is partitioned will have edges that are aligned with some of the edges of A and/or B. The algorithm also assumes that the rectangles are not rotated.

Figure 5A:
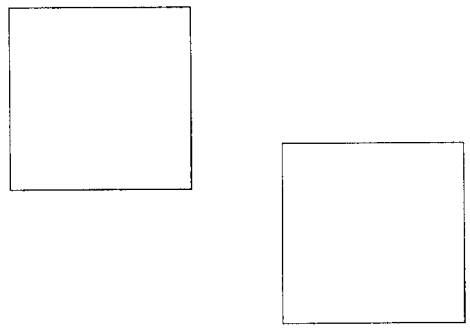
FIGS. 5A through 5Q illustrate the seventeen possible ways in which two rectangles/images can be positioned with respect to one another.
Figure 5B:
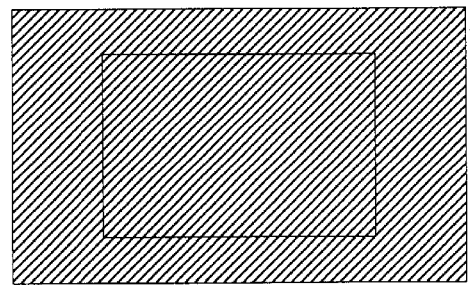
Figure 5C:
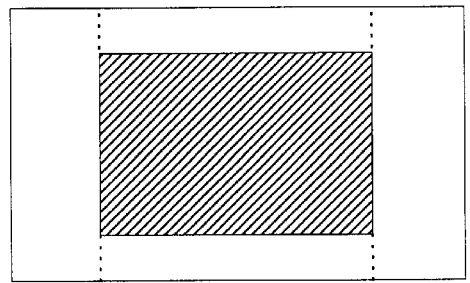
Figure 5E:
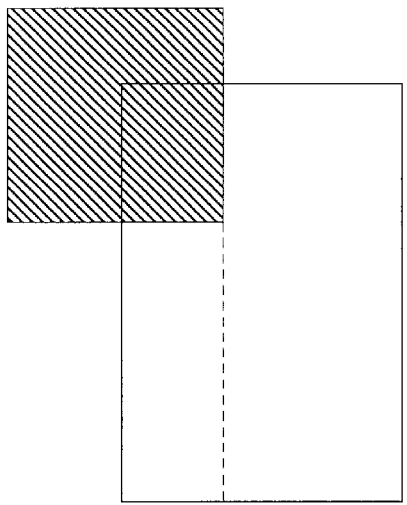
Figure 5G:
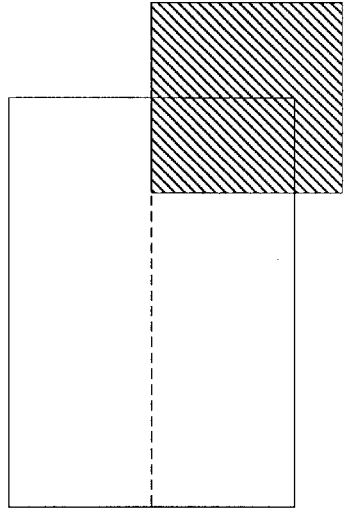
Figure 5D:
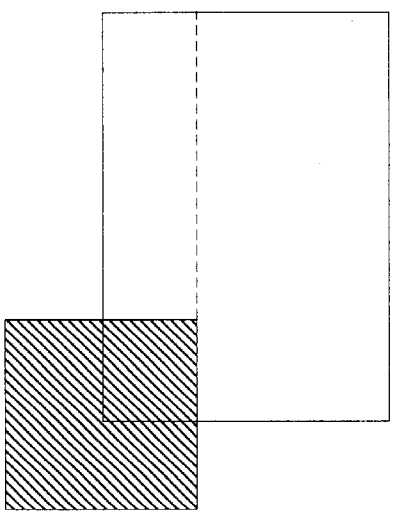
Figure 5F:
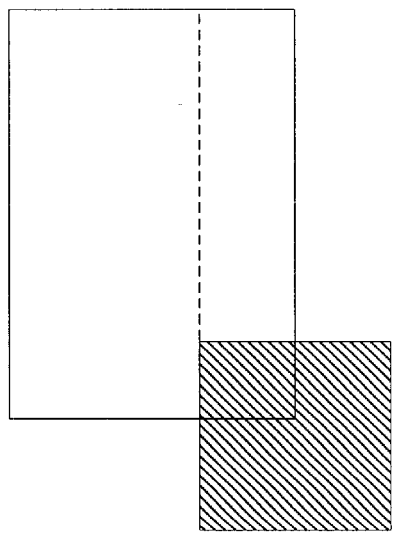
Figure 5I:
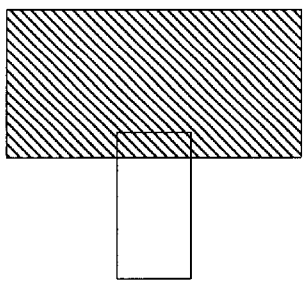
Figure 5K:
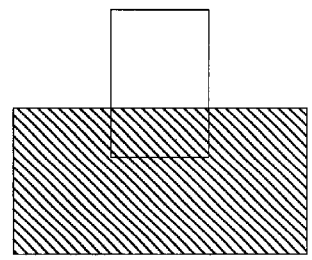
Figure 5H:
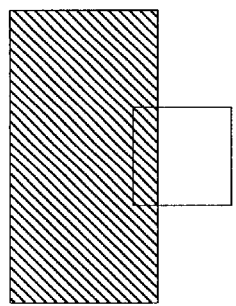
Figure 5J:
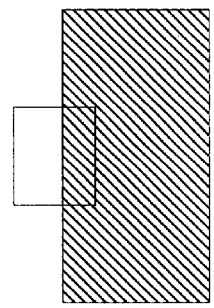
Figure 5M:
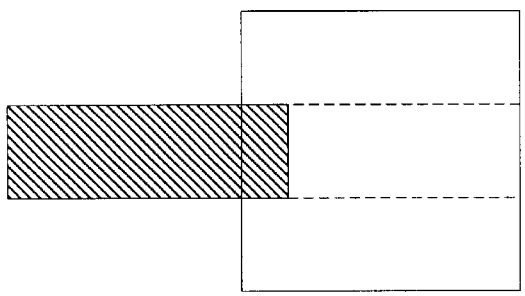
Figure 5O:
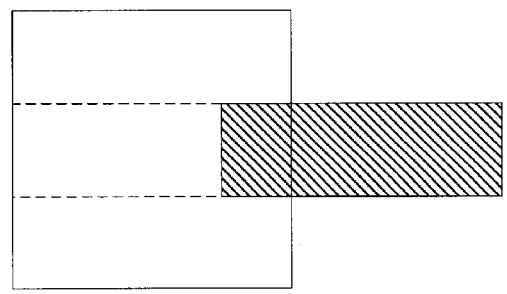
Figure 5L:
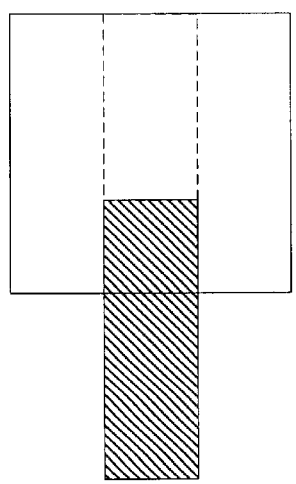
Figure 5N:
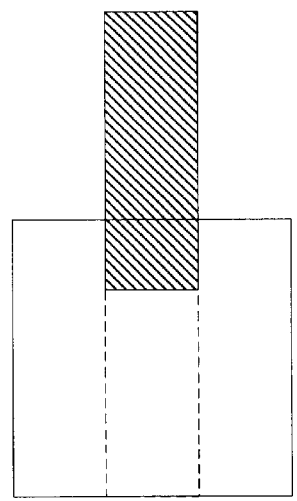
Figure 5Q:
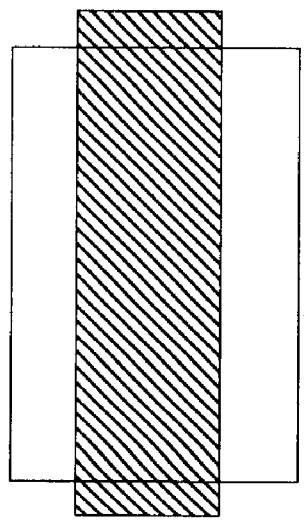
Figure 5P:
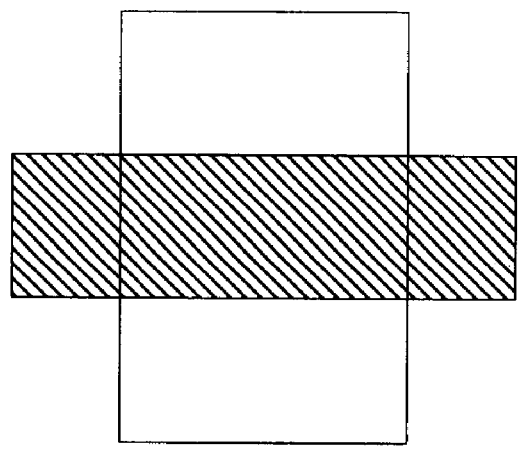

As illustrated in FIGS. 5A through 5Q, there are seventeen ways in which two rectangles A and B can be positioned with respect to each other. In each case where the two rectangles overlap, the top rectangle is hatched. The algorithm handles each of these cases separately when making partitioning decisions. Some of the cases are similar (the only difference is that they are rotated by a multiple of 90°). In cases 1 and 2 (FIGS. 5A and 5B respectively), the bottom-most rectangle B is not partitioned because there is no non-overlapped portion to partition. In case 1 there is no intersection and in case 2 the bottom rectangle is completely covered by the top rectangle. In each of the remaining cases 3 through 17, the bottom rectangle is partitioned as shown in FIGS. 5C through 5Q respectively. Where the top rectangle is positioned such that the bottom rectangle is partitioned into more than one new rectangle (FIGS. 5C through 5G and 5L through 5O, dashed lines have been added to show the partitioning.

Given a set of N images, this scheme can take up to $O(N^2)$ operations to finish. Furthermore, the number of rectangles may grow with a theoretical upper bound of $O(N^2)$, where N is the number of images and O is a standard notation used in complexity theory. Although such a situation is unlikely to occur in practice, to avoid generating excessively high numbers of rectangles, the algorithm is preferably designed to stop partitioning once a maximum number of rectangles, say 100, has been exceeded. Once the preset maximum is reached, the algorithm stops partitioning, performs any final processing, and then sends the data as is. That is, images with higher z-order are sent in full along with the current (and in this case last) set of visible rectangles.

As the foregoing description demonstrates, the image partitioning techniques of the present invention are particularly well suited for use in connection with online graphics applications where a user is working with multiple overlapping images. The partitioning algorithm can be implemented using software, hardware, or combination thereof. With that in mind, it is to be understood that the block and flow diagrams used to illustrate the techniques of the present invention show the performance of certain specified functions and relationships thereof. The boundaries of these functional blocks have been arbitrarily defined herein for convenience of description. Alternate boundaries may be defined so long as the specified functions are performed and the relationships between the functions are appropriately maintained. The diagrams and accompanying description provide the functional information one skilled in the art would require to implement a system to perform the processing required. Each of the functions depicted in the block and flow diagrams may be implemented, for example, by software, functionally equivalent hardware, or a combination thereof.

While embodiments of the invention have been described, many further alternatives, modifications and variations will be evident to those skilled in the art in light of the foregoing description. The invention described herein is intended to embrace all such alternatives, modifications, applications and variations as may fall within the spirit and scope of the appended claims.

What is claimed is:

1. A method for partitioning a group of images, each of which overlaps, or is overlapped by, at least on other image in the group of images, the group of images including a first, bottom-most image, at least one middle image, and a last, top-most image, said method comprising:

partitioning a non-overlapped portion of the first image into a plurality of rectangles based on the position of a second image immediately in front of, and partially overlapping, the first image to form a first set of visible rectangles;

forming new sets of visible rectangles by iteratively partitioning a current set of visible rectangles based on the position of a next image in the group of images that is immediately in front of, and partially overlaps, the current set of visible rectangles, until a final set of visible rectangles is formed based on the position of the top-most image; and transmitting only the final set of visible rectangles.

2. The method of claim 1, wherein the first set of visible rectangles includes the second image, and each new set of visible rectangles includes the image on which the partitioning for that new set is based.

3. The method of claim 1, wherein the partitioning step is done in a partially compressed domain.

4. An apparatus for partitioning a group of images, each of which overlaps, or is overlapped by, at least one other image in the group of images, the group of images including a first, bottom-most image, at least one middle image, and a last, top-most image, said apparatus comprising:

means for partitioning a non-overlapped portion of the first image into a plurality of rectangles based on the position of a second image immediately in front of, and partially overlapping, the first image to form a first set of visible rectangles;

means for forming new sets of visible rectangles by iteratively partitioning a current set of visible rectangles based on the position of a next image in the group of images that is immediately in front of, and partially overlaps, the current set of visible rectangles, until a final set of visible rectangles is formed based on the position of the top-most image; and means for transmitting only the final set of rectangles.

5. The apparatus of claim 4, wherein the first set of visible rectangles includes the second image, and each new set of visible rectangles includes the image on which the partitioning for that new set is based.

6. The apparatus of claim 4, wherein the partitioning function is done in a partially compressed domain.

7. A medium readable by a device embodying a program of instructions for execution by said device to perform a method for partitioning a group of images, each of which overlaps, or is overlapped by, at least one other image in the group of images, the group of images including at a first, bottom-most image, at least one middle image, and a last, top-most image, said program of instructions comprising:

instructions for partitioning a non-overlapped portion of the first image into a plurality of rectangles based on the position of a second image immediately in front of, and partially overlapping, the first image to form a first set of visible rectangles;

instructions for forming new sets of visible rectangles by iteratively partitioning a current set of visible rectangles based on the position of a next image in the group of images that is immediately in front of, and partially overlaps, the current set of visible rectangles, until a final set of rectangles is formed based on the position of the top-most image; and instructions for transmitting only the final set of rectangles.

8. The device readable medium of claim 7, wherein the first set of visible rectangles includes the second image, and each new set of visible rectangles includes the image on which the partitioning for that new set is based.

9. The device readable medium of claim 7, wherein the instructions for partitioning include instructions for partitioning in partially compressed domain.

* * * * *

UNITED STATES PATENT AND TRADEMARK OFFICE
CERTIFICATE OF CORRECTION

PATENT NO. : 6,625,309 B1
DATED : September 23, 2003
INVENTOR(S) : Chia-Hsin Li et al.

It is certified that error appears in the above-identified patent and that said Letters Patent is hereby corrected as shown below:

Column 7,
Line 21, change "at least on" to -- at least one --

Signed and Sealed this

Twenty-fourth Day of February, 2004

JON W. DUDAS
*Acting Director of the United States Patent and Trademark Office*